(12) United States Patent
Stricker (10) Patent No.: US 10,669,162 B2
(45) Date of Patent: Jun. 2, 2020

(54) PORTABLE SELF-CONTAINED WATER FILTER APPARATUS

(71) Applicant: Herbert Stricker, South Lyon, MI (US)

(72) Inventor: Herbert Stricker, South Lyon, MI (US)

( * ) Notice: Subject to any disclaimer, the term of this patent is extended or adjusted under 35 U.S.C. 154(b) by 0 days.

(21) Appl. No.: 14/509,088

(22) Filed: Oct. 8, 2014

(65) Prior Publication Data

US 2019/0092648 A1 Mar. 28, 2019
US 2019/0256370 A9 Aug. 22, 2019

Related U.S. Application Data

(60) Provisional application No. 62/001,877, filed on May 22, 2014.

(51) Int. Cl.
*C02F 1/00* (2006.01)
*B01D 35/30* (2006.01)

(52) U.S. Cl.
CPC .............. *C02F 1/002* (2013.01); *B01D 35/30* (2013.01); *C02F 2307/10* (2013.01)

(58) Field of Classification Search
CPC ....... C02F 1/002; C02F 2307/10; B01D 35/30

USPC ................. 210/459, 446, 449, 455
See application file for complete search history.

(56) References Cited

U.S. PATENT DOCUMENTS

| | | | | |
|---|---|---|---|---|
| 4,966,698 A | * | 10/1990 | Hensley ............... | B01D 36/001 210/269 |
| 6,432,305 B1 | * | 8/2002 | Sumner ............. | B01D 35/0273 210/232 |
| 2007/0199875 A1 | * | 8/2007 | Moorey ............... | B01D 61/147 210/206 |
| 2013/0087205 A1 | * | 4/2013 | Berardi ................... | F16L 11/00 137/1 |
| 2015/0096937 A1 | * | 4/2015 | Munro ................... | B01D 61/10 210/652 |

* cited by examiner

*Primary Examiner* — Madeline Gonzalez
(74) *Attorney, Agent, or Firm* — Paratus Law Group, PLLC

(57) ABSTRACT

The present disclosure relates to a portable water filter kit including a portable housing unit with an interior space. The portable housing unit includes an input nozzle and an output nozzle for connecting to a hose, piping between the input and output nozzle located in the interior of the portable housing unit, and a filter. The portable water filter kit is configured such that all components may be stored in the interior space of the portable housing unit.

15 Claims, 15 Drawing Sheets

PORTABLE SELF-CONTAINED WATER FILTER APPARATUS

REFERENCE TO PRIORITY DOCUMENTS

This application claims priority under 35 USC 119(e) to U.S. Provisional Application Ser. No. 62/001,877, filed May 22, 2014, which is incorporated by reference for all purposes.

SUMMARY OF THE INVENTION

The invention described herein relates to an apparatus for making filtration of drinking water more facile, for those who camp, travel in RV's or boats, or any other endeavour that requires portable potable water supply.

Faced with the constant frustration of always having to carry the hoses (with standard garden hoses whose fittings have an outside diameter of 1.0625 inches with 11.5 threads per inch—represents a preferred embodiment) along with the filter apparatus, the inventor devised a device which solves the problem. A bucket-type article, equipped with a filter module, for in-line hookup from the potable water source, to the delivery hose, and also provided with space for storing the bulky hoses, is the main embodiment of the invention.

A long-felt need has been solved by the present invention, as the separate storing of water hoses is obviated hereby. Further enhancements of the invention are contemplated as well, such as providing the device with an electrically-powered water pump, or special retractable hoses so that the total size of the device can be decreased.

Also, an additional, electrically-powered UV-assisted antimicrobial treatment step is contemplated within the scope of the invention.

Different types of in-line filter modules are contemplated within the scope of the invention, such as activated carbon, ceramic porous filters, and even fine sand filters, to eliminate particulate matter only, as is a problem with some drinking water obtained from wells.

The activated carbon filter is especially good at eliminating chemical contaminants, and the porous ceramic more suited to eliminating bacterial contaminants. Fine sand is most useful for eliminating particulate contaminants. A three-stage filter is contemplated with the present invention.

So, for use in RV's, campers, camp sites, boating, the invention is unparalleled. The source hose is provided with an adapter so that it may be connected with any standard water spigot.

The invention will now be further described by reference to the illustrations (FIGS. 1 through 18).

DETAILS

Figure 1:
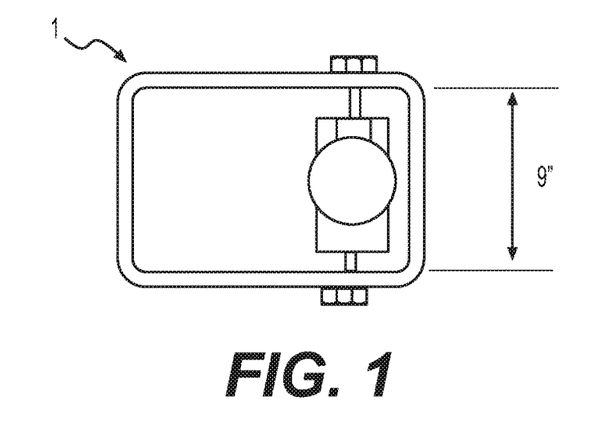
FIG. 1 shows the device from a top view. The storage area for hoses is shown on the left side of the diagram, and the filter module is shown on the right side of the diagram. Hook ups for a standard garden hose are on either side of the device. Water flow is preferably in one direction, but some multidirectional filters exist as well.
Figure 2:
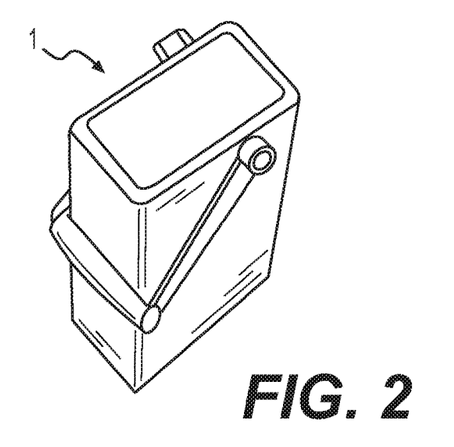
FIG. 2 shows the device from an off-center top view. Ample storage space for a 2 foot source hose and a 25 foot long delivery hose is inside the bucket part of the device.
Figure 3:
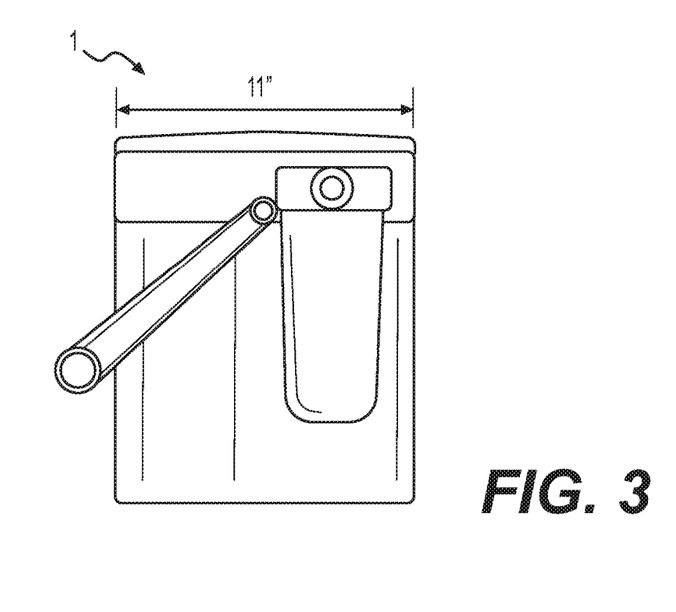
FIG. 3 shows the device from a side view, with a cutaway so that the filter module is visible.
Figure 4:
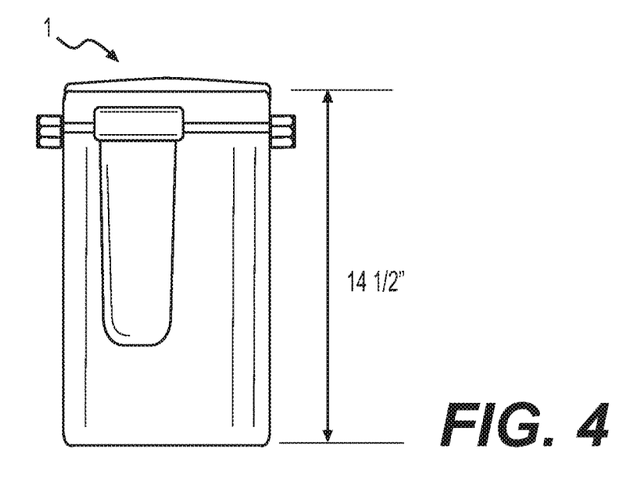
FIG. 4 shows the device from a front view, with a cutaway so that the filter module is visible.
Figure 5:
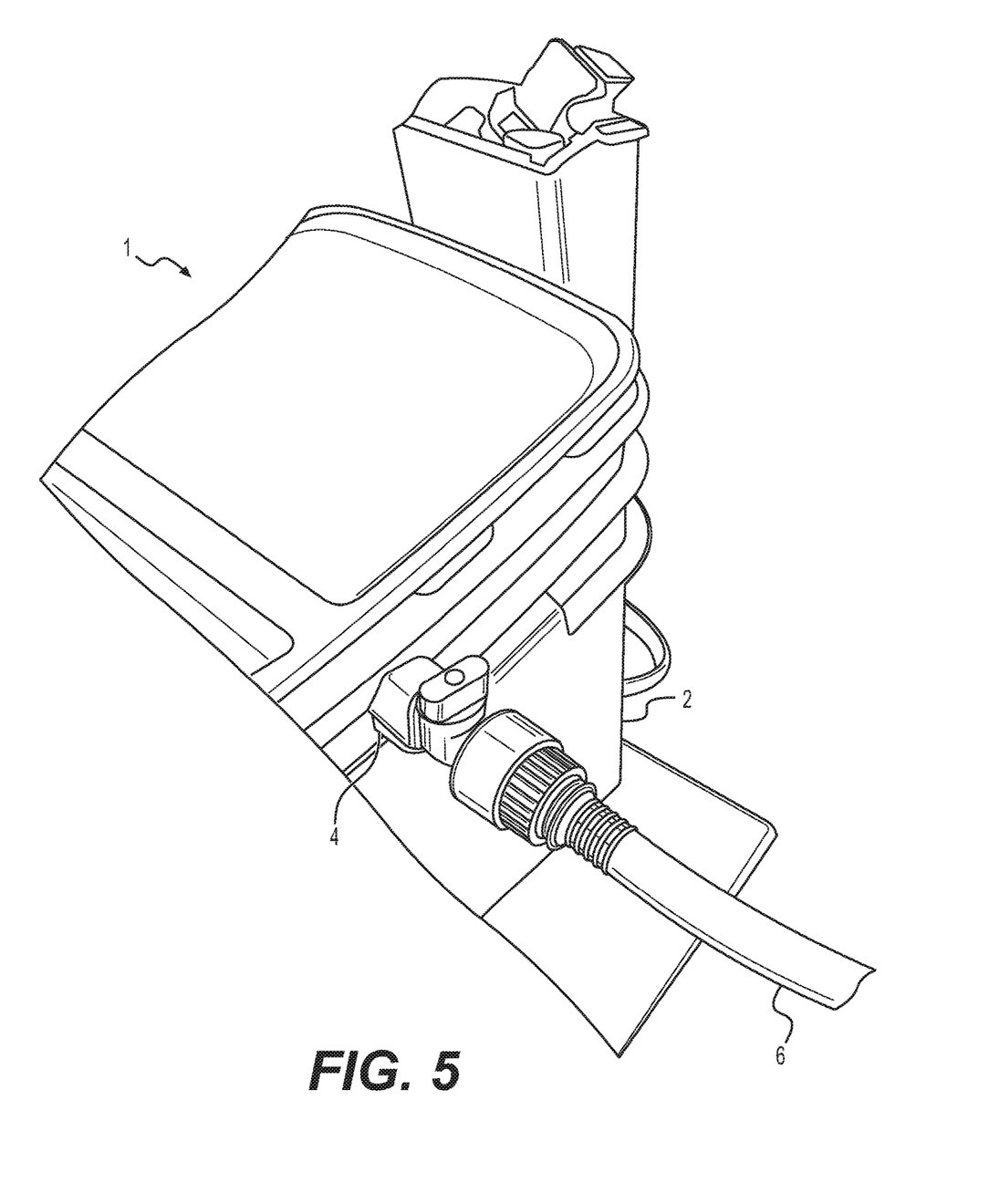
FIG. 5 shows the device from an angled top view from the water outlet side so that the side from which water exits the filter is shown connected to a valve and a water hose.
Figure 6:
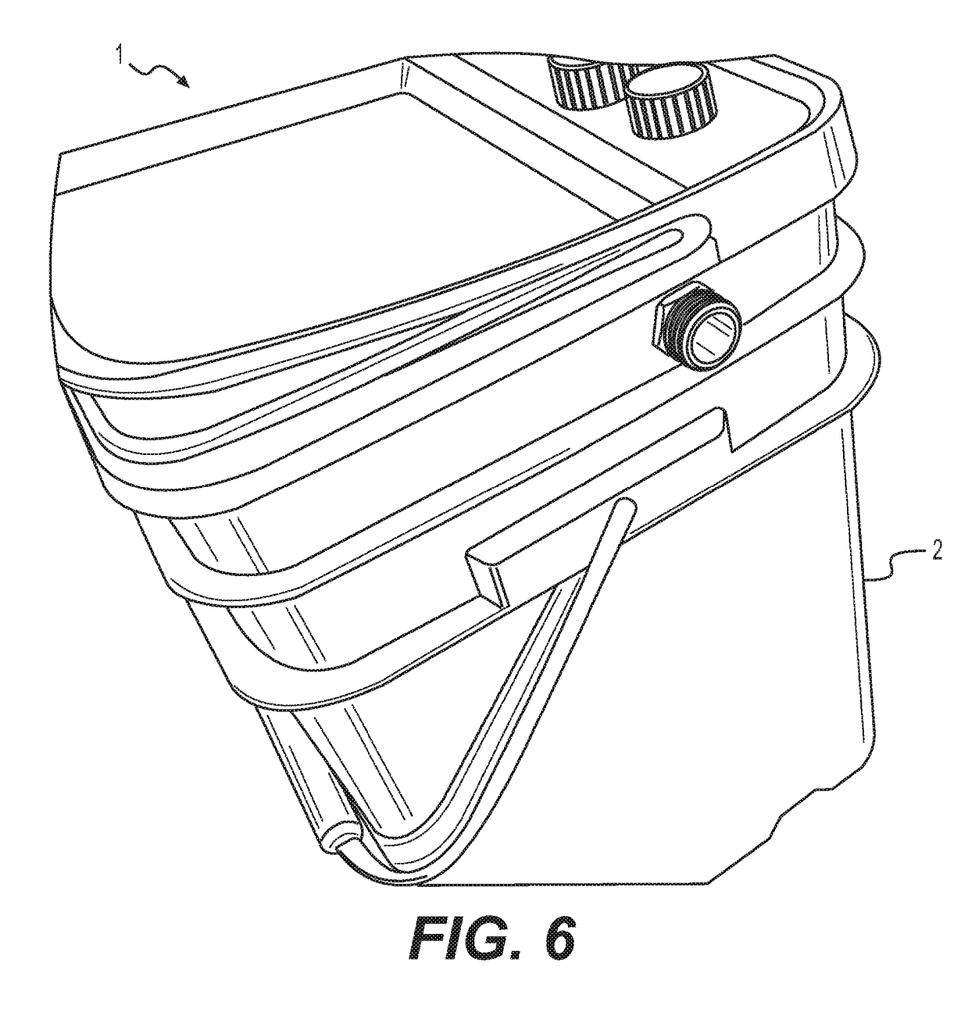
FIG. 6 shows the device from an angled top view from the water inlet side so that side from which water is supplied to the device is shown.
Figure 7:
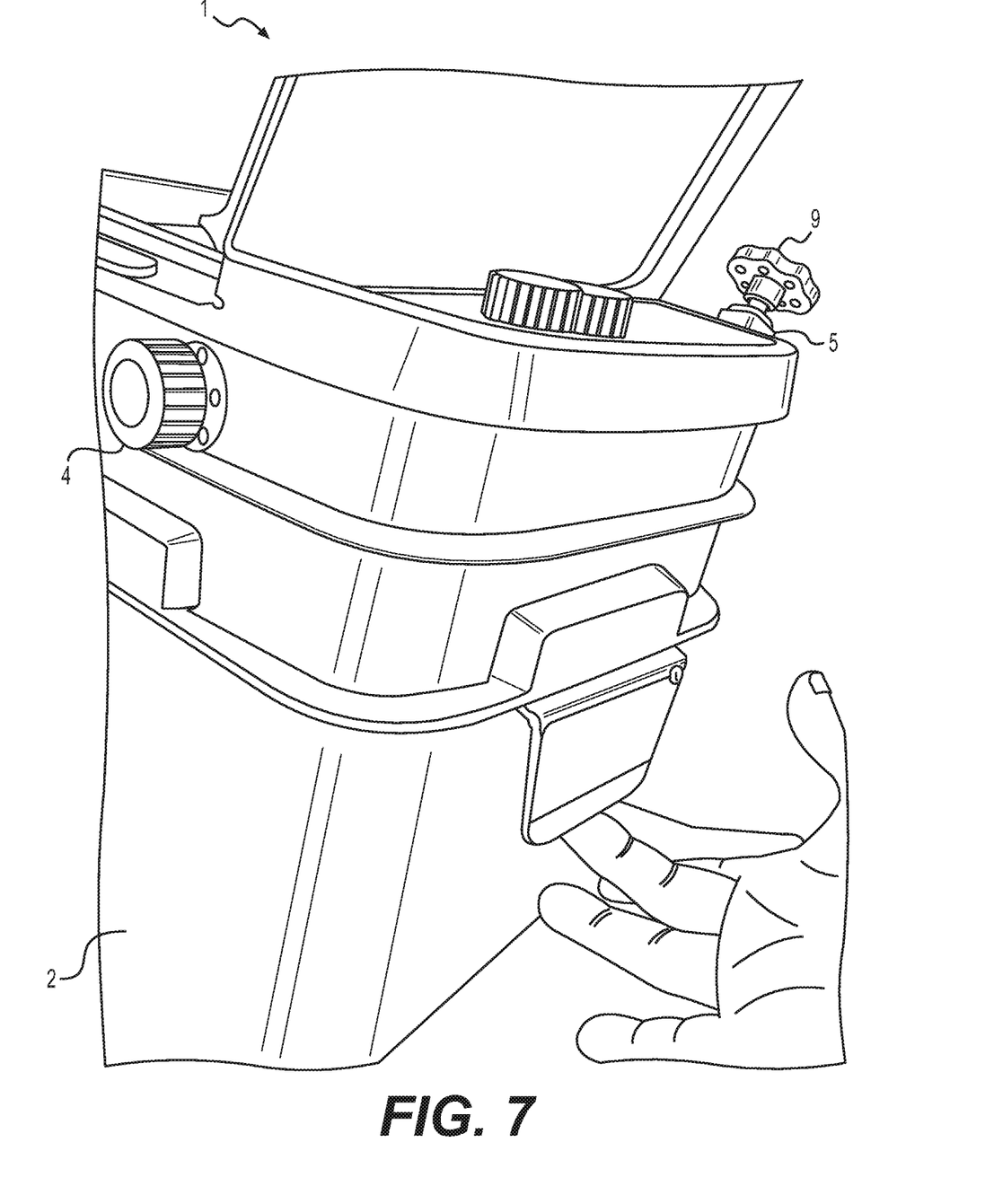
FIG. 7 shows the device from an angled side view so that the water inlet is shown on one side and a metal handle is shown on another side.
Figure 8:
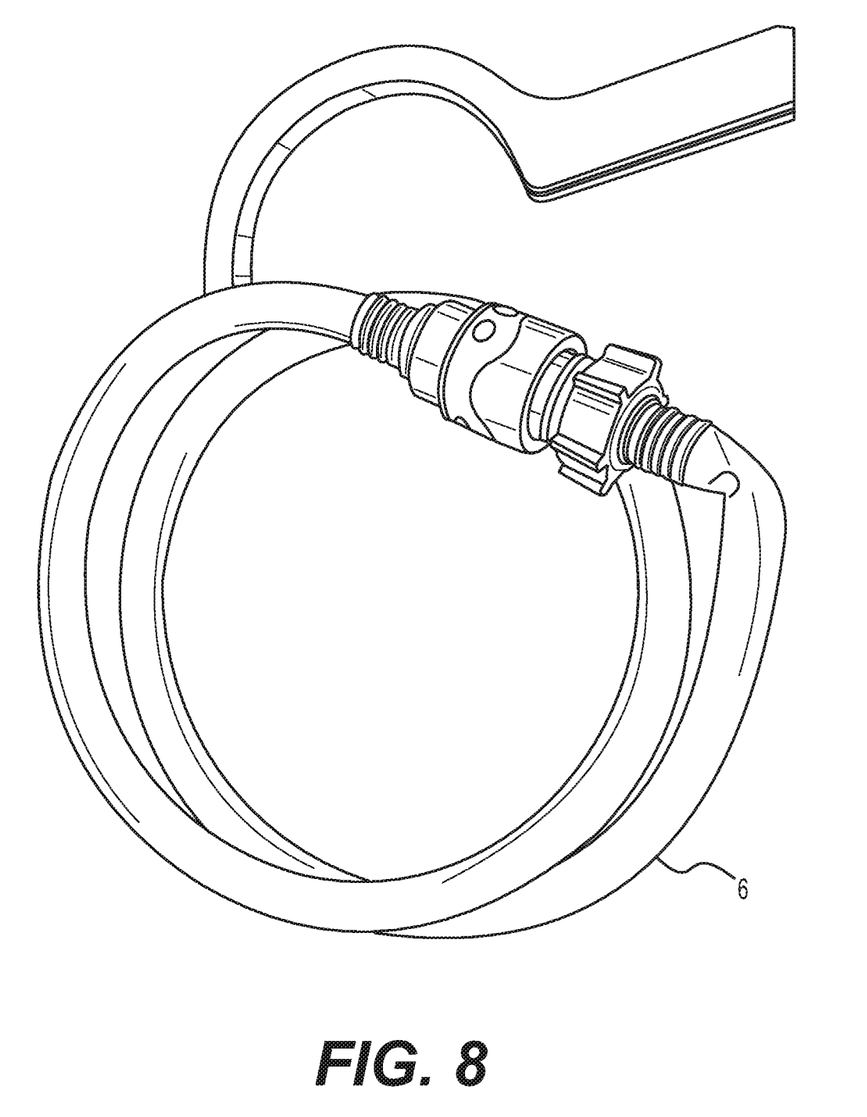
FIG. 8 shows a standard hose with fittings and a water filter removal tool. The hose and tool are able to be stored in the storage area of the device.
Figure 9:
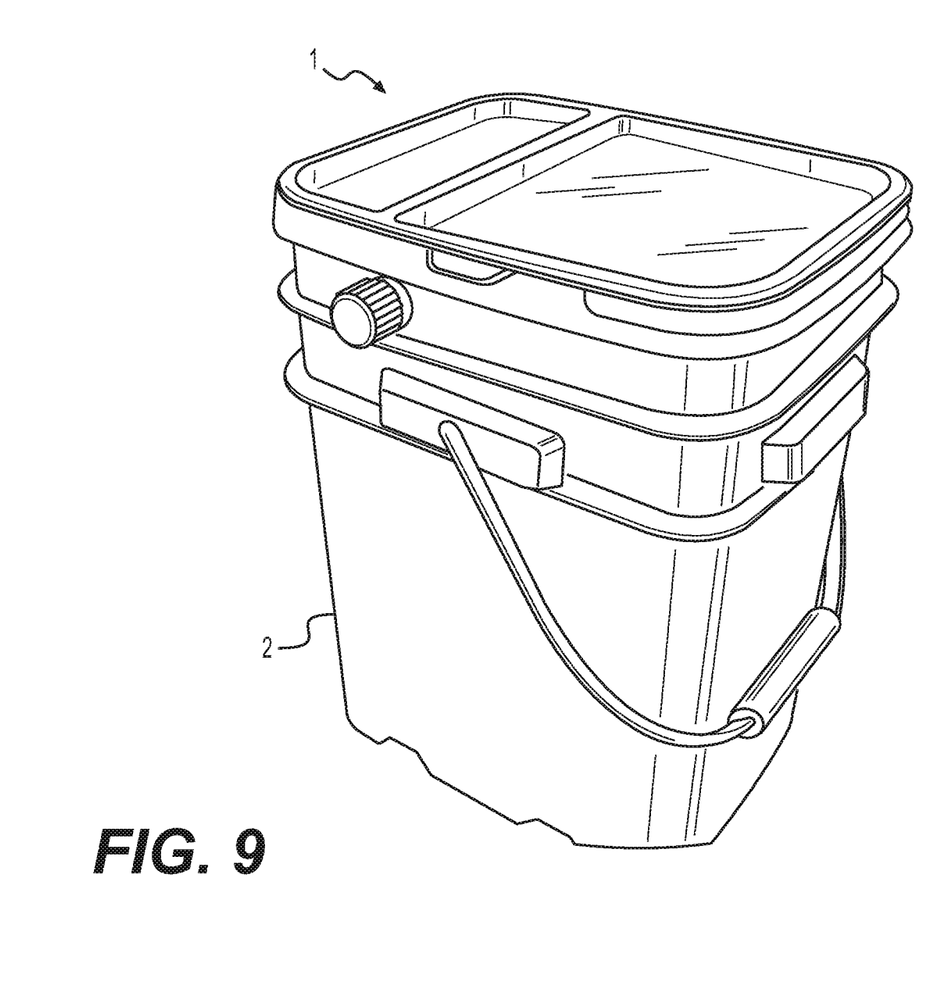
FIG. 9 shows the device from an angled top view from the water outlet side so that the side from which water exits the filter is shown with a plastic protective cap that protects a brass outlet fitting of the device. A similar protective plastic cap can be provided for the water inlet side of the device.
Figure 10:
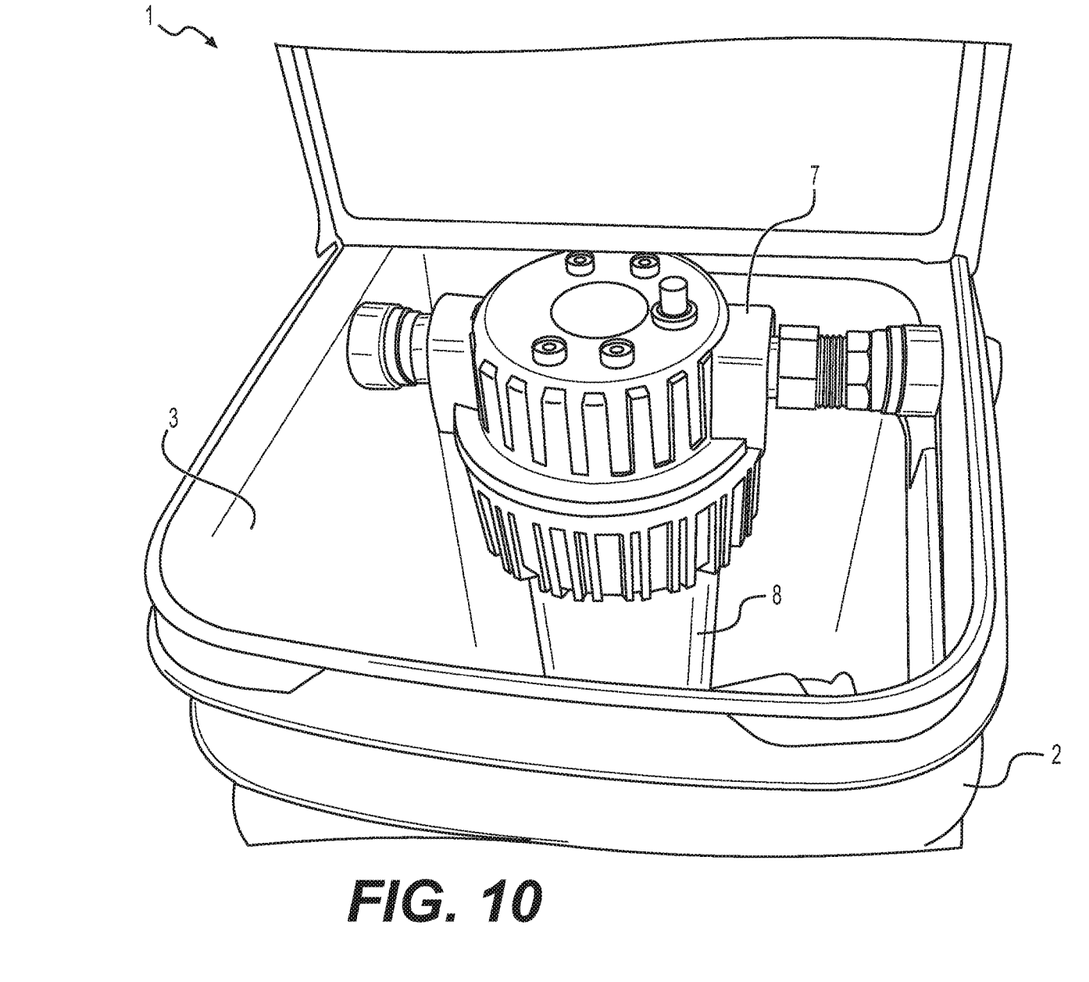
FIG. 10 shows the device from a top view with the lid of the device open such that the water filter is visible.
Figure 11:
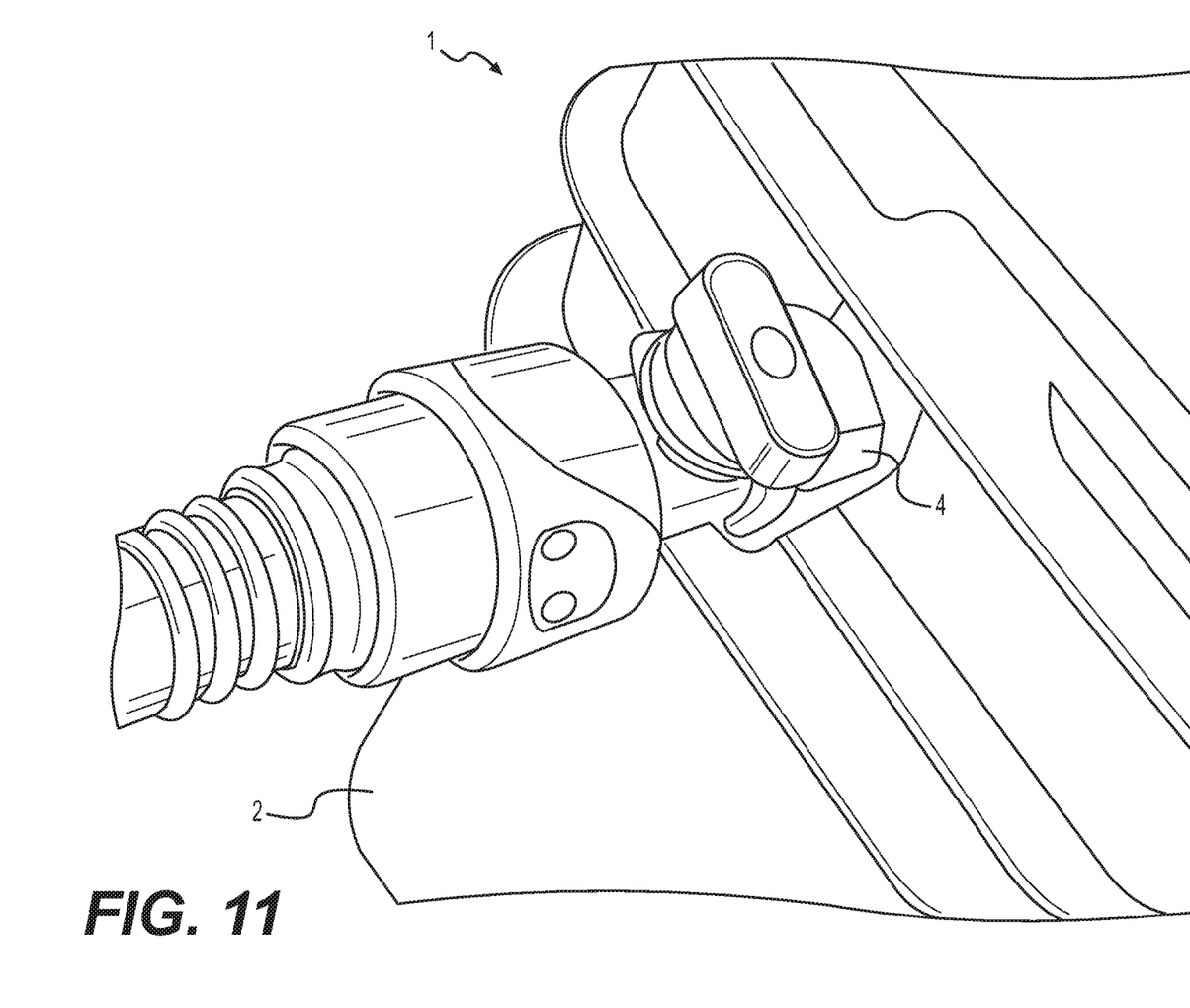
FIG. 11 shows the device from the water outlet side of the device connected to a valve and a water hose.
Figure 12:
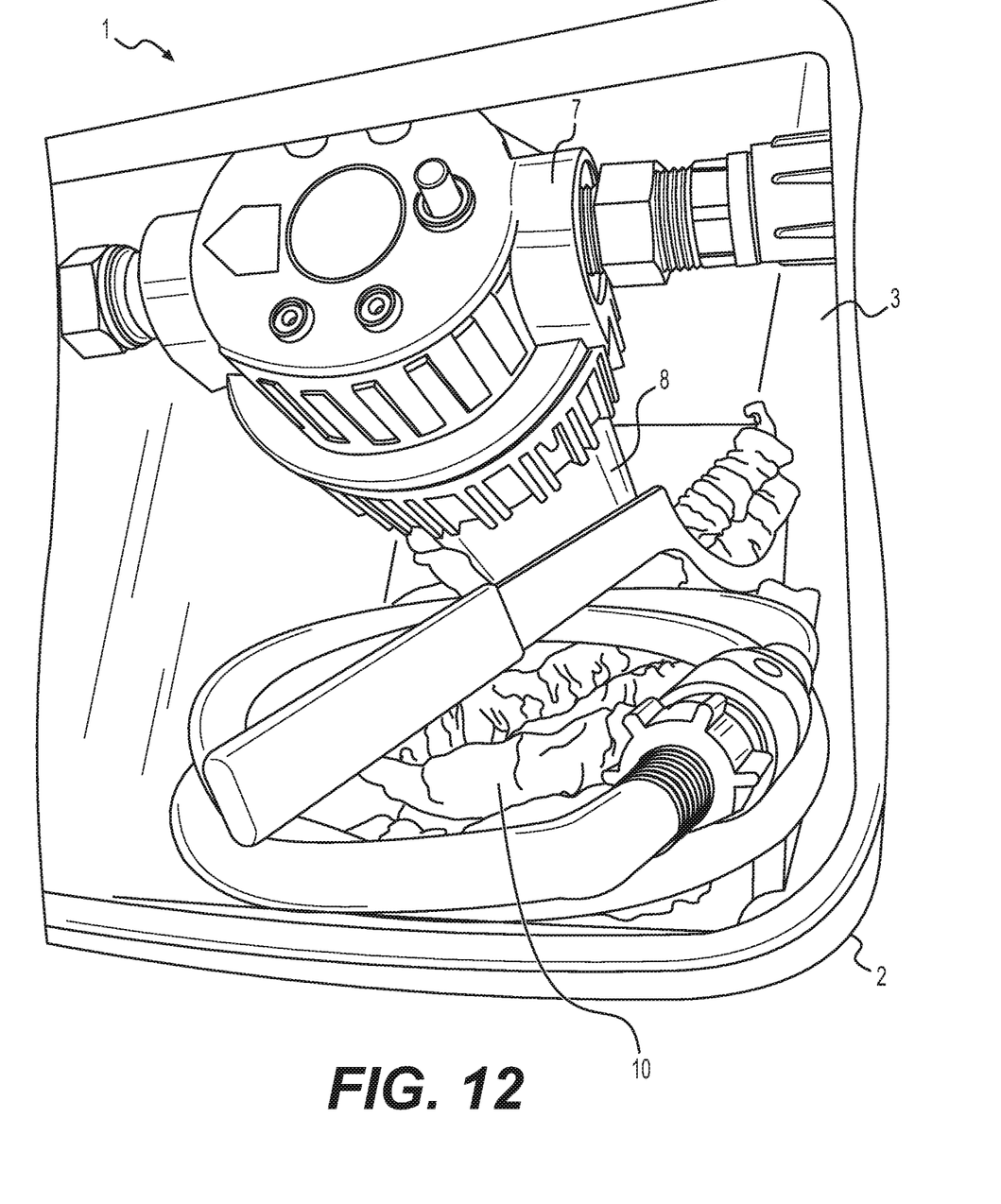
FIG. 12 shows the device from a top view with the lid of the device open such that the water filter is visible. Ample storage space for a 2 foot source hose, a 25 foot long delivery hose, and a water filter removal tool is inside the bucket part of the device.
Figure 13:
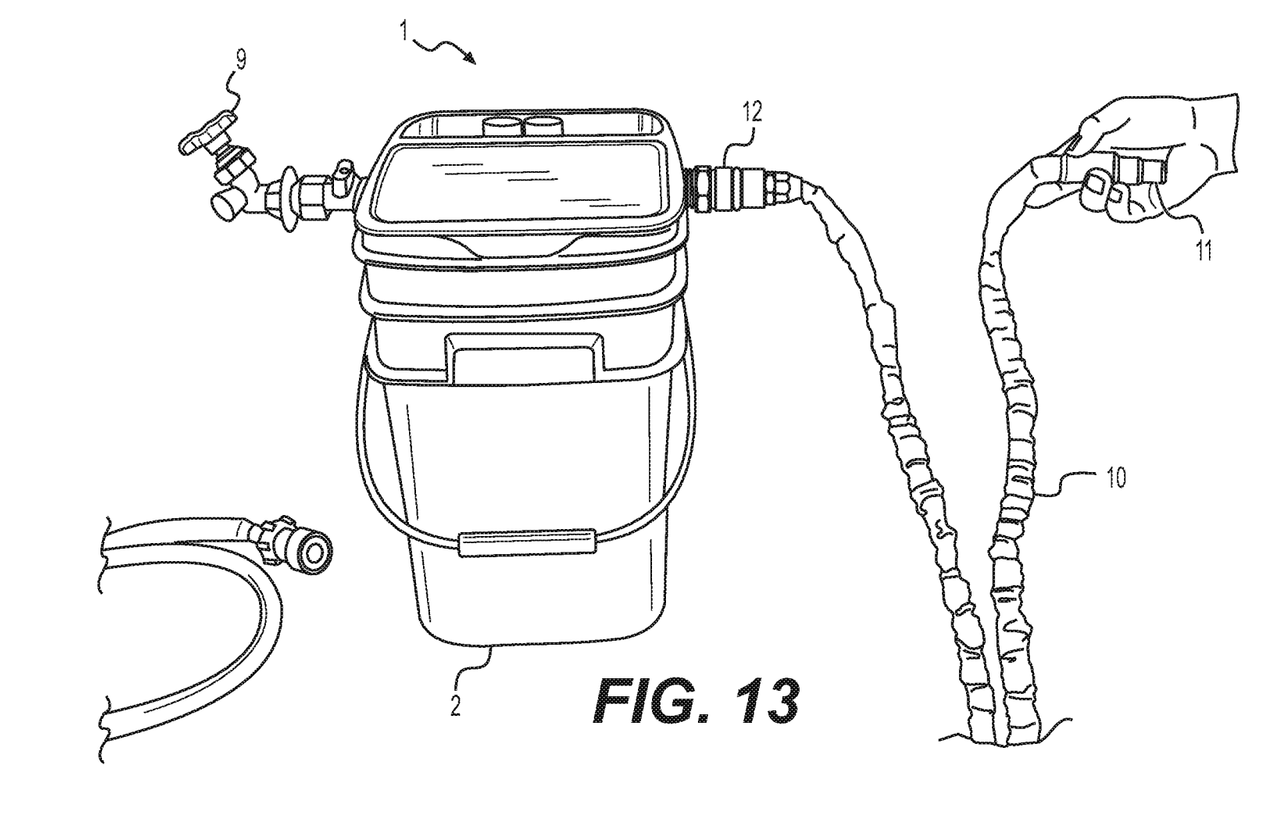
FIG. 13 shows the device connected to hose on the water inlet side and a water valve connected to the water exit side.
Figure 14:
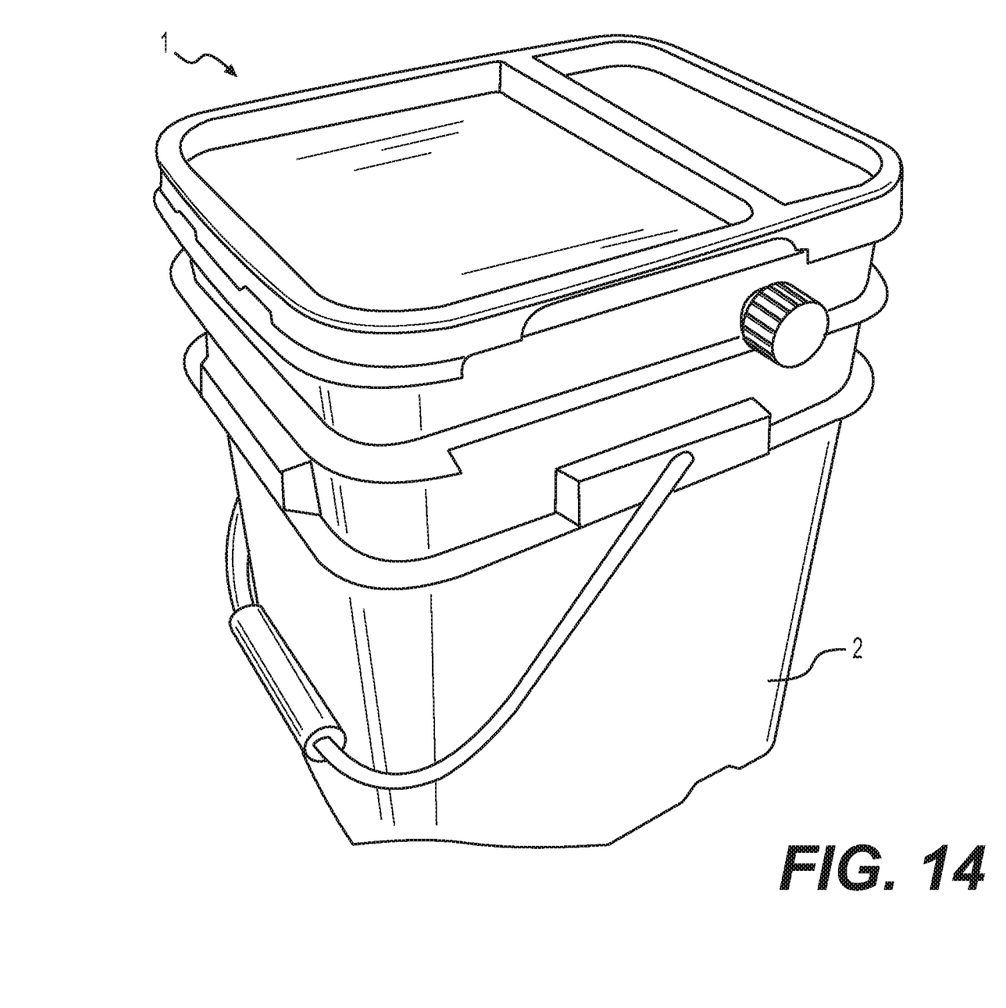
FIG. 14 shows the device from an angled top view from the outlet side so that the side from which water exits the filter is shown with a plastic protective cap that protects the brass outlet fitting of the device.
Figure 15:
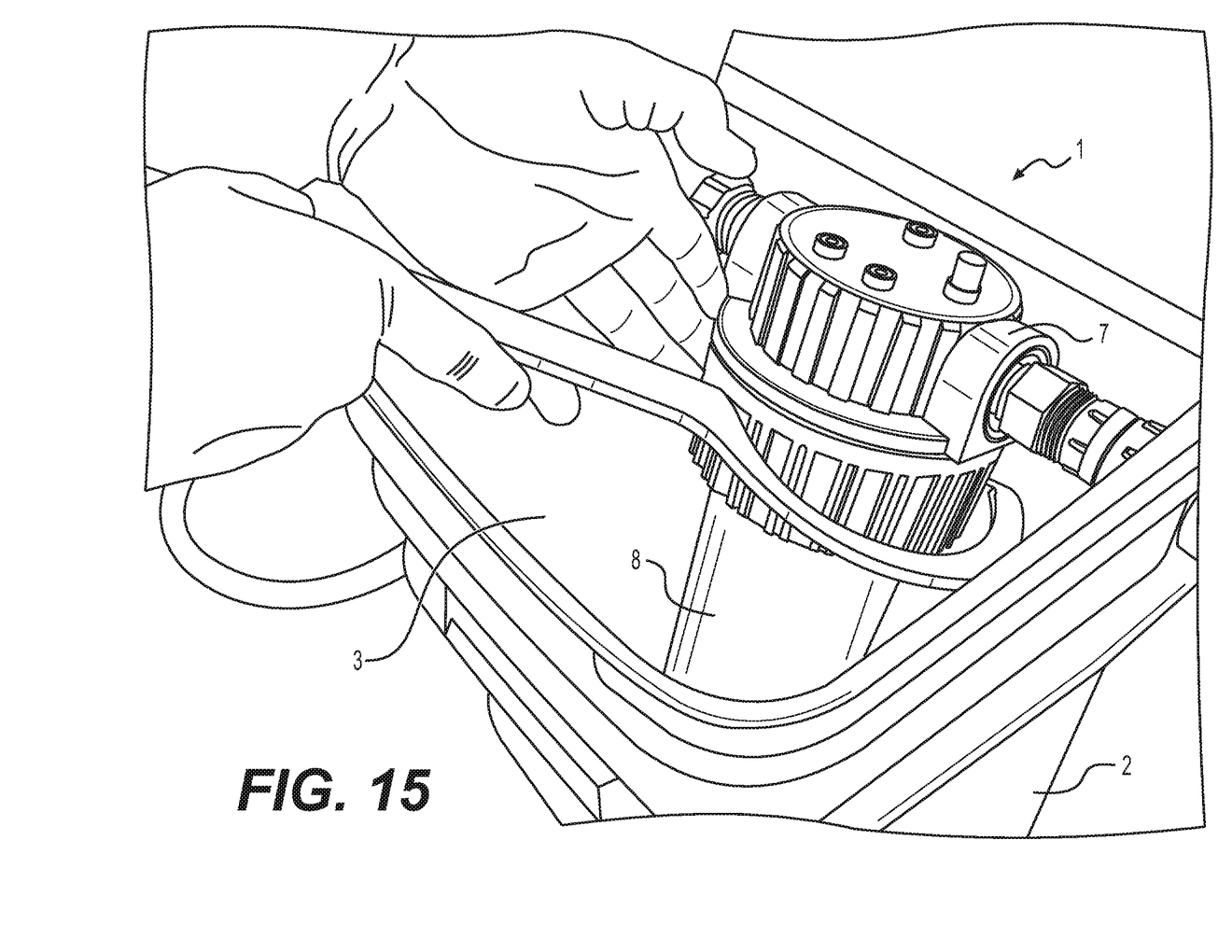
FIG. 15 shows the device from a top view with the lid of the device open such that the water filter is visible. The water filter is able to be tilted, as shown, to enable a user to access the water filter with a water filter removal tool.
Figure 16:
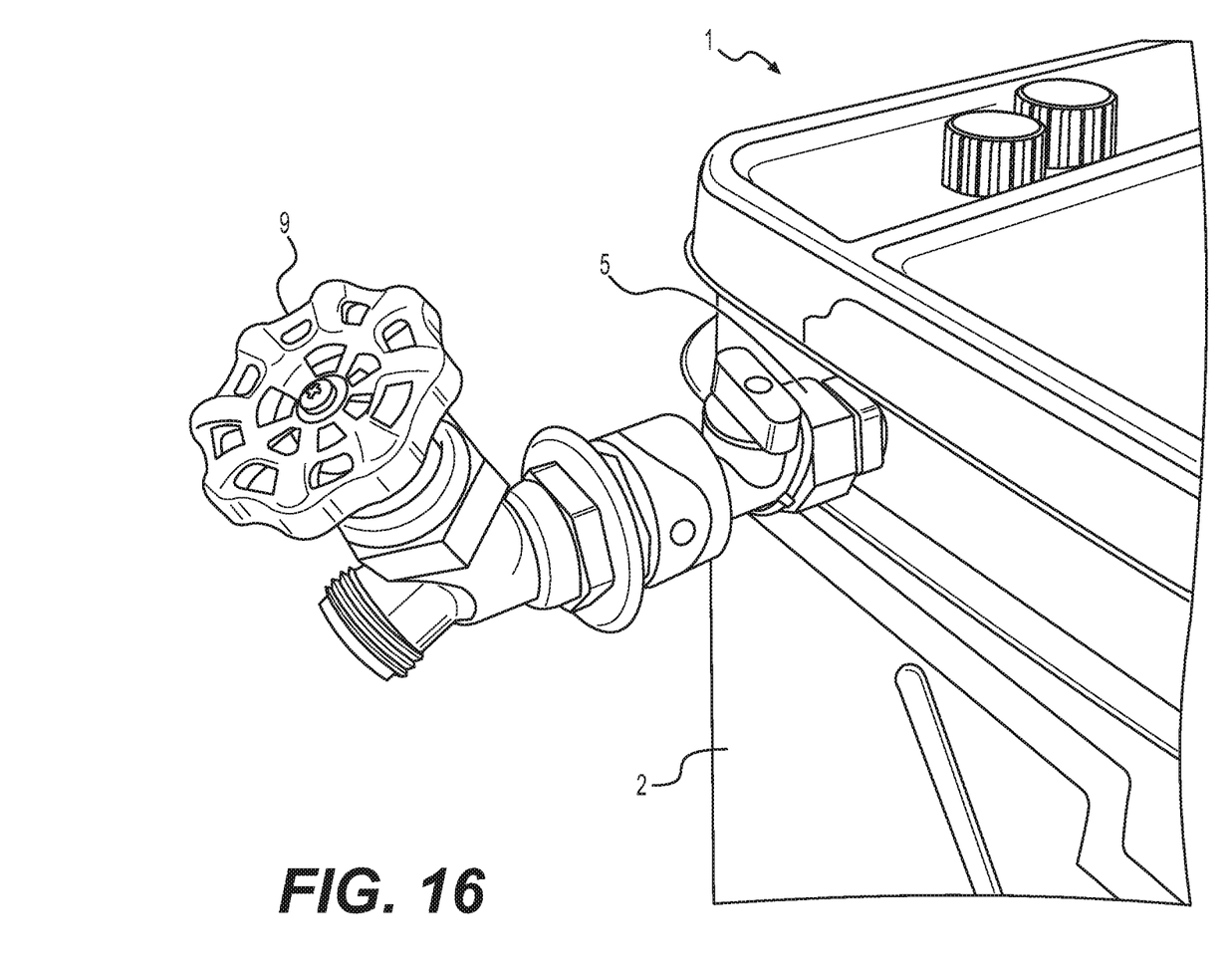
FIG. 16 shows the device from an angled top view from the water outlet side so that the side from which water exits the filter is shown with a two valves connected inline to the water outlet of the device.
Figure 17:
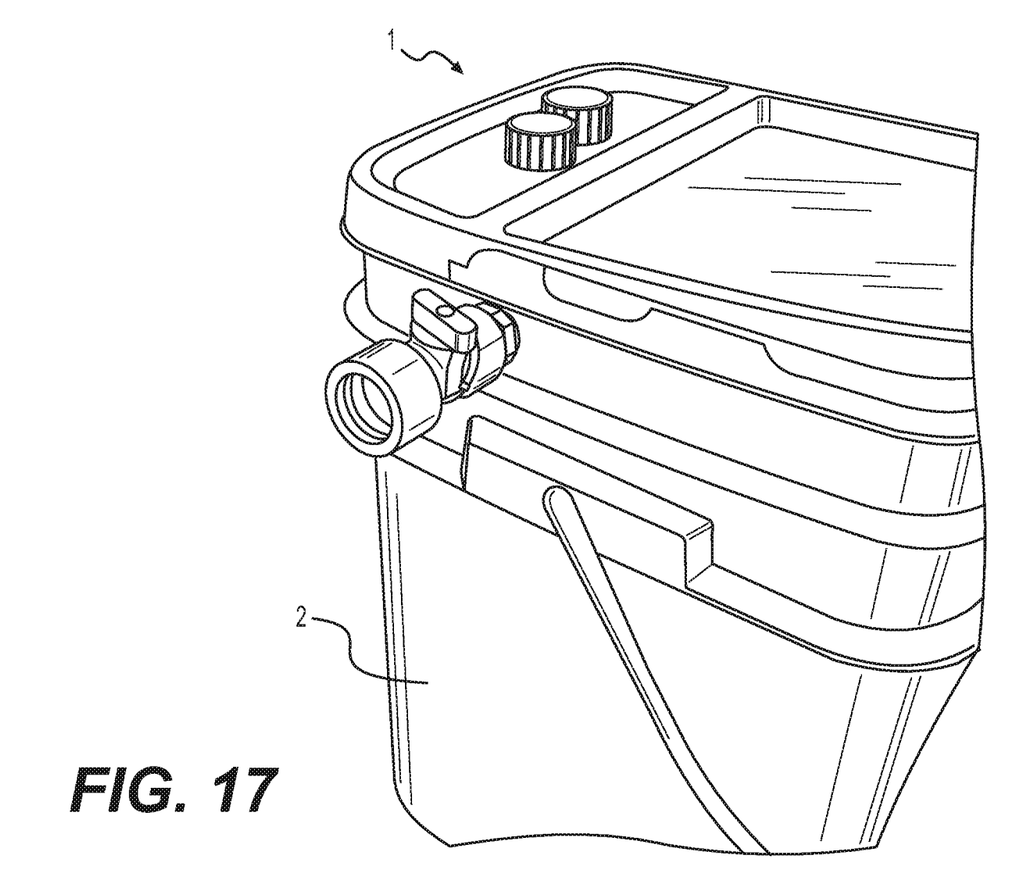
FIG. 17 shows the device from an angled top view from the water outlet side so that the side from which water exits the filter is shown connected to a valve.
Figure 18:
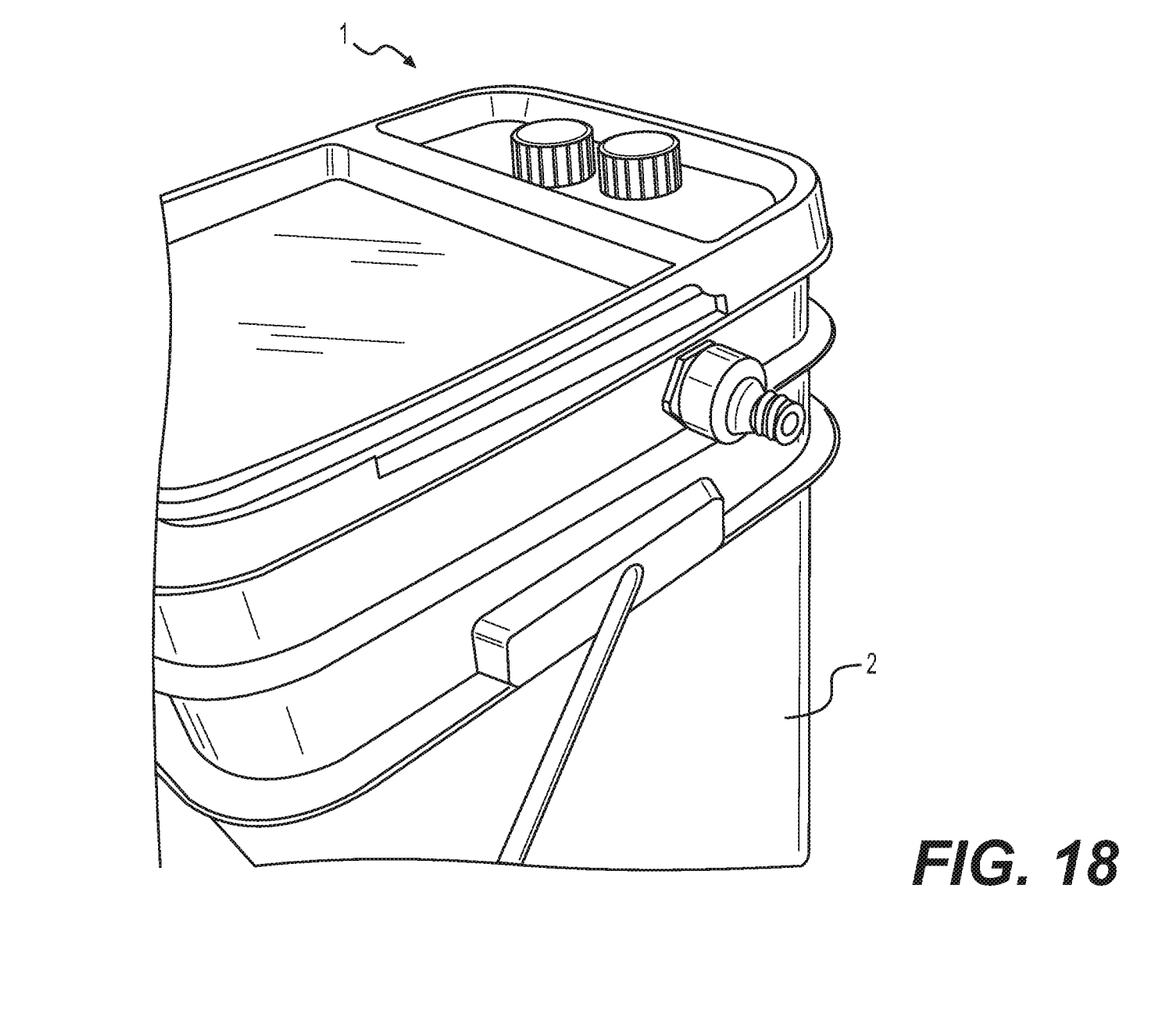
FIG. 18 shows the device from an angled top view from the water inlet side so that the side from which water enters the filter is shown connected to a fitting.

The invention includes:

A portable water filter kit 1, including:

a portable housing unit 2, with an interior space 3; said portable housing unit 2 including an input nozzle 4 and an output nozzle 5;

said input 4 and output 5 nozzles being for connecting to a hose 6;

piping 7 between said input 4 and output 5 nozzle located in the interior space of said portable housing unit 2;

said piping 7 including a filter 8;

wherein said portable water filter kit 1 is configured such that all components may be stored in the interior space 3 of said portable housing unit 2.

The portable water filter kit 1 generally includes a filter 8 that is a 10 ug filter.

The portable water filter kit 1 has input 4 and output 5 nozzles include a hose connection.

The portable water filter kit 1 further includes a water tap 9 connected to said output nozzle 5.

The portable water filter kit 1 further includes an expandable hose 10, said expandable hose having a standard hose connection 11 on one end and a lockable connection 12 for the input nozzle 4 on the other.

I claim:

1. A portable water filter kit, including:
   a portable housing unit having a base and a plurality of side walls fixedly attached to the base forming a hollow interior space, one side wall of the plurality of side walls including one opening therein and another side wall of the plurality of side walls including another opening therein;
   a removable lid covering the hollow interior space;
   piping connected to an input nozzle at one end of the piping, connected to an output nozzle at another end of the piping, and located in the hollow interior space of the portable housing unit; and
   a filter removably attached to the piping,
   wherein the input nozzle is located within the one opening and the output nozzle is located within the another opening,
   wherein the piping is supported by the one opening and the another opening,
   wherein the input nozzle and the output nozzle are for connecting to a hose, and
   wherein the portable water filter kit is configured such that the piping, the hose, and the filter may be stored in the hollow interior space of the portable housing unit.

2. The portable water filter kit as recited in claim 1, wherein the filter is a water filter.

3. The portable water filter kit as recited in claim 1, wherein the input nozzle and the output nozzle include a hose connection.

4. The portable water filter kit as recited in claim 1, further including:
   a water tap connected to the output nozzle.

5. The portable water filter kit as recited in claim 1, further including:
   an expandable hose, the expandable hose having a threaded hose connection on one end and a lockable connection for the input nozzle on another end.

6. The portable water filter kit as recited in claim 1, wherein the one side wall is opposite to the another side wall.

7. The portable water filter kit as recited in claim 1, wherein an entirety of the piping located between the input nozzle and the output nozzle is linear.

8. The portable water filter kit as recited in claim 1, wherein the piping, the input nozzle, and the output nozzle are arranged linearly in a direction from the input nozzle to the output nozzle.

9. The portable water filter kit as recited in claim 8, wherein the filter is rotatively movable about an axis to permit the filter to tilt toward side walls of the plurality of side walls adjacent to the one side wall and the another side wall.

10. The portable water filter kit as recited in claim 9, wherein the axis extends in the direction from the input nozzle to the output nozzle.

11. The portable water filter kit as recited in claim 9, wherein the piping is rotatively movable about an axis to permit the filter to tilt toward the side walls of the plurality of side walls adjacent to the one side wall and the another side wall.

12. The portable water filter kit as recited in claim 9, wherein the piping includes an attachment point for attaching the filter, the attachment point being located within the portable housing unit and at a bottom side of the piping.

13. The portable water filter kit as recited in claim 1, wherein the input nozzle and the output nozzle are each located at an upper half of the portable housing unit.

14. The portable water filter kit as recited in claim 1, wherein the one opening and the another opening are located between a top portion of the portable housing unit and a bottom portion of the portable housing unit, and
   wherein the one opening is located at one position in the one side wall and the another opening is located at another position directly opposite to the one position in the another side wall.

15. The portable water filter kit as recited in claim 1, wherein the piping is not supported by the removable lid.

\* \* \* \* \*